United States Patent
Yano et al.

(10) Patent No.: US 8,364,484 B2
(45) Date of Patent: Jan. 29, 2013

(54) VOICE RECOGNITION APPARATUS AND METHOD

(75) Inventors: Takehide Yano, Yokohama (JP);
Tadashi Amada, Yokohama (JP);
Kazunori Imoto, Kawasaki (JP); Koichi Yamamoto, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 713 days.

(21) Appl. No.: 12/423,209

(22) Filed: Apr. 14, 2009

(65) Prior Publication Data
US 2009/0326944 A1    Dec. 31, 2009

(30) Foreign Application Priority Data
Jun. 30, 2008    (JP) .................... 2008-170047

(51) Int. Cl.
*G10L 15/00* (2006.01)
*G10L 11/00* (2006.01)
*G10L 19/02* (2006.01)
*H04M 11/00* (2006.01)
*H04M 1/64* (2006.01)

(52) U.S. Cl. ........ 704/246; 704/275; 704/236; 704/255; 704/235; 704/229; 379/100.15; 379/88.01

(58) Field of Classification Search .................... 704/246
See application file for complete search history.

(56) References Cited

U.S. PATENT DOCUMENTS

| | | | |
|---|---|---|---|
| 4,340,783 A * | 7/1982 | Sugiyama et al. | 379/100.15 |
| 6,477,492 B1 * | 11/2002 | Connor | 704/236 |
| 6,487,277 B2 * | 11/2002 | Beyda et al. | 379/88.01 |
| 6,587,822 B2 * | 7/2003 | Brown et al. | 704/275 |
| 6,704,708 B1 * | 3/2004 | Pickering | 704/235 |
| 6,941,269 B1 * | 9/2005 | Cohen et al. | 704/275 |
| 7,089,184 B2 * | 8/2006 | Rorex | 704/255 |
| 7,181,401 B2 * | 2/2007 | Johnson et al. | 704/277 |
| 2004/0019484 A1 * | 1/2004 | Kobayashi et al. | 704/258 |
| 2007/0078650 A1 * | 4/2007 | Rogers | 704/229 |
| 2008/0004881 A1 * | 1/2008 | Attwater et al. | 704/275 |

FOREIGN PATENT DOCUMENTS

| | | |
|---|---|---|
| JP | 2005-037615 | 2/2005 |
| JP | 2006-243730 | 9/2006 |

OTHER PUBLICATIONS

Japanese Office Action for Japanese Patent Application No. 2008-170047 mailed on Mar. 27, 2012.

* cited by examiner

*Primary Examiner* — Pierre-Louis Desir
*Assistant Examiner* — Neeraj Sharma
(74) *Attorney, Agent, or Firm* — Turocy & Watson, LLP

(57) ABSTRACT

An input voice detect is detected after starting a voice input waiting state; the detected voice is recognized; an elapsed time from the start of the voice input waiting state is counted; an informative sound which urges a user to input the voice is outputted when the elapsed time reaches a preset output set time; and the output of the informative sound is stopped when the elapsed time at the time of inputting the voice is shorter than the output set timedetect.

10 Claims, 8 Drawing Sheets

F I G. 2
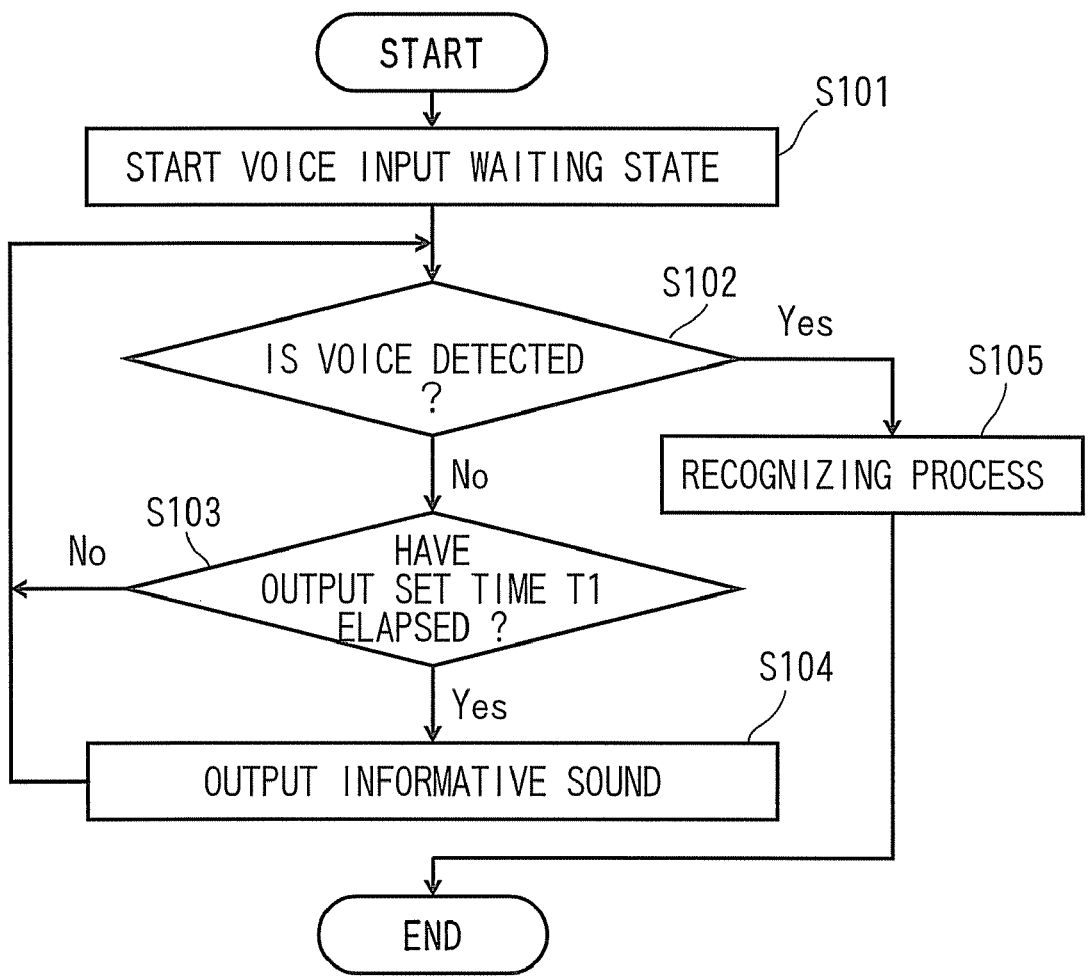

VOICE RECOGNITION APPARATUS AND METHOD

CROSS-REFERENCE TO RELATED APPLICATIONS

This application is based upon and claims the benefit of priority from the prior Japanese Patent Application No. 2008-170047, filed on Jun. 30, 2008; the entire contents of which are incorporated herein by reference.

FIELD OF THE INVENTION

The present invention relates to a voice recognition apparatus and, more specifically, to a voice recognition apparatus which outputs an informative sound for urging a user to input a voice and a method thereof.

DESCRIPTION OF THE BACKGROUND

In a voice recognition apparatus configured to operate the apparatus by a voice input by a user using a voice recognizing process, there is an apparatus which outputs an informative sound for the purpose of informing the user that the apparatus is ready for the voice input or urging the user to input the voice (see Japanese Patent No. 3654045).

However, in the case of the voice recognition apparatus in the related art, even when the user has started the voice input before the informative sound is outputted, the informative sound is outputted during a vocalization.

When the informative sound is outputted while the user is vocalizing, the user might be puzzled by the informative sound, which might result in unclear vocalization, or the user might stop vocalization.

Consequently, the voice input which is not suitable for the voice recognizing process is resulted, which leads to erroneous recognition, and thereby causing an erroneous operation, so that the satisfaction level of the user is lowered. Alternatively, when the informative sound during the vocalization is mixed with a voice signal, it influences the voice recognition, which causes erroneous recognition.

In other words, the voice recognition apparatus in the related art has a problem such that the satisfaction level of the user is lowered because the erroneous operation is caused by an event that the informative sound is outputted during the vocalization even when the user has started the voice input before the informative sound is outputted.

SUMMARY OF THE INVENTION

In order to solve the problem in the related art as described above, it is an object of the invention to provide a voice recognition apparatus which is able to generate an informative sound which does not hinder the vocalization of a user and a method thereof.

According to embodiments of the present invention, there is provided a voice recognition apparatus including: an input unit configured to input a voice of a user; a voice detecting unit configured to detect the inputted voice after starting a voice input waiting state where a voice recognition is enabled and the input of the voice is waited; a voice recognizing unit configured to recognize the detected voice; a timer unit configured to count an elapsed time from the start of the voice input waiting state; an output unit configured to output an informative sound which urges the user to input the voice at a moment when the elapsed time reaches a preset output set time; and a control unit configured to control the output unit either to stop the output of the informative sound, to lower a volume of the informative sound to a level lower than a reference volume, to change a frequency of the informative sound from a reference frequency, or to shorten a length of an output duration of the informative sound shorter than the length of a reference output duration when the elapsed time at the time of inputting the voice is shorter than the output set time.

According to the embodiments of the invention, an operation which does not hinder the vocalization of the user is enabled by restraining the informative sound on the basis of a timing which detects the voice input.

BRIEF DESCRIPTION OF THE DRAWINGS

FIG. 2 is a flowchart of the same voice recognition apparatus;

DETAILED DESCRIPTION OF THE INVENTION

Figure 1:
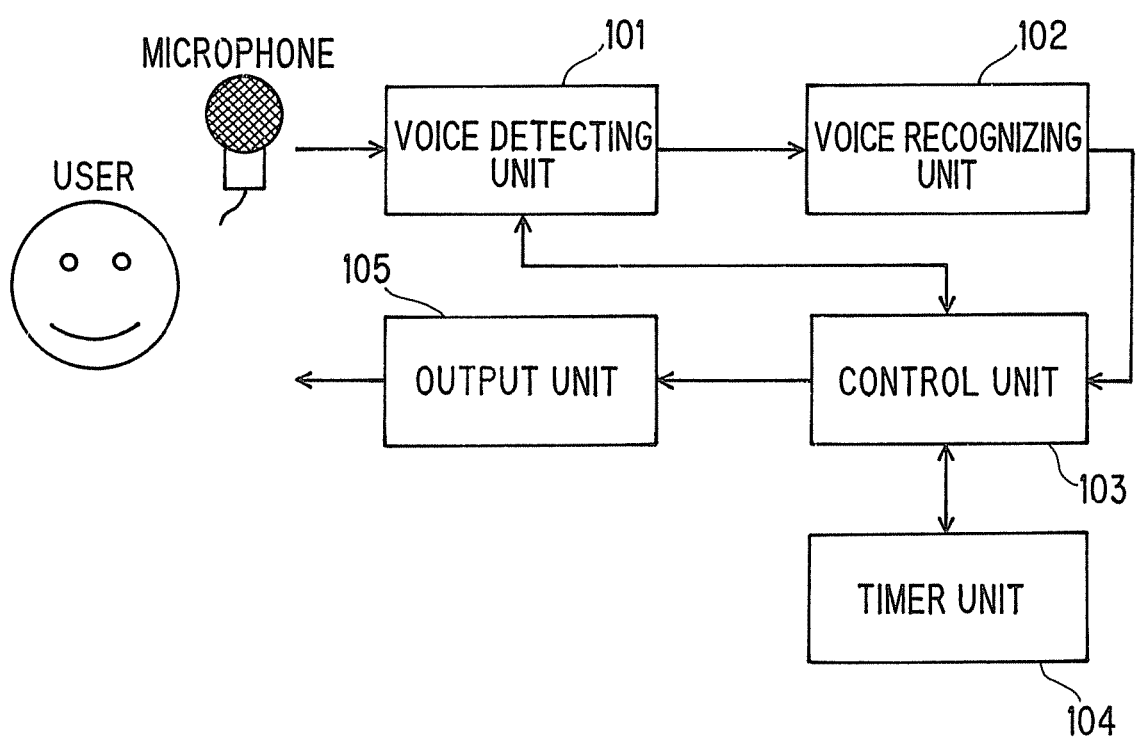
FIG. 1 is a block diagram showing a configuration of a voice recognition apparatus according to a first embodiment of the invention.

Referring now to the drawings, a voice recognition apparatus according to embodiments of the invention will be described.

First Embodiment

Referring now to FIG. 1 and FIG. 2, a voice recognition apparatus according to a first embodiment of the invention will be described.

FIG. 1 is a block diagram showing the voice recognition apparatus according to the first embodiment.

The voice recognition apparatus includes a voice detecting unit 101 configured to detect a voice of a user from an input signal inputted from a microphone, a voice recognizing unit 102 configured to recognize the voice of the user and output the result of voice recognition; a control unit 103 configured to control the voice recognition apparatus according to the result of the voice recognition; a timer unit 104 configured to inform the time to output an informative sound, and an output unit 105 such as a speaker configured to present the output from the control unit 103 to the user.

Functions of the respective components 101, 102, 103 and 104 of the voice recognition apparatus may be implemented by a program transmitted to or stored in a computer readable medium.

The voice detecting unit 101 starts a voice input waiting state upon reception of information to start the voice input waiting state from the control unit 103, that is, upon entry of a waiting start signal. The "voice input waiting state" means a state where a voice recognition processing is enabled in the voice recognition apparatus and the input of the voice is waited for. An existing method may be used for voice detection. When the start of the voice input from the user is detected during the voice input waiting state, an event of the start of the voice input is informed to the control unit 103. Also, voice signals during a period from the start of the voice input by the user until the end of the voice input are outputted to the voice recognizing unit 102. The voice input waiting state may be started even when the information from the control unit 103 is not received. When the event of the start of the voice input is informed under a state in which the control unit 103 does not inform the start of detection, the control unit 103 determines that the corresponding event is ineffective.

The voice recognizing unit 102 applies a voice recognizing process to the voice input signal outputted from the voice detecting unit 101 and outputs the result of voice recognition to the control unit 103. An existing method may be used for voice recognition.

The control unit 103 outputs the waiting start signal which indicates the start of the voice input waiting state to the voice detecting unit 101 and requests the timer unit 104 to count an elapsed time Ts. When the fact that the elapsed time Ts from the start of the voice input waiting state reaches elapsed by an output set time T1 is informed by the timer unit 104, the control unit 103 causes the output unit 105 to output the informative sound for urging the user to input. However, when the event of the start of the voice input is informed by the voice detecting unit 101 before the elapsed time Ts reaches the output set time T1, the control unit 103 acts not to output the informative sound even when the output set time T1 elapses.

A timing when the control unit 103 informs the start of the voice input waiting state to the voice detecting unit 101 is, for example, when the user pushes a button which informs the start of the voice input or when the response outputted to the user is ended. Alternatively, it may be a timing which is shifted by a predetermined time from this timing.

Upon reception of the waiting start signal which indicates that the start of the voice input waiting state is started from the control unit 103, the timer unit 104 starts counting of the elapsed time Ts, and when the elapsed time Ts reaches the output set time T1, the timer unit 104 informs the control unit 103 that the output set time T1 has elapsed.

The output unit 105 outputs the informative sound when information to output the informative sound is received from the control unit 103.

Referring now to FIG. 1 and FIG. 2, an operation of the voice recognition apparatus according to the first embodiment will be described. FIG. 2 is a flowchart showing the operation of the voice recognition apparatus.

The control unit 103 firstly outputs the waiting start signal which indicates the start of the voice input waiting state to the voice detecting unit 101, and requests the timer unit 104 to start the counting of the elapsed time Ts (Step S101).

When the voice detecting unit 101 detects the voice of the user (Yes in Step S102), the voice detecting unit 101 informs the event of the start of the voice input to the control unit 103, and the voice recognizing unit 102 starts the voice recognizing process (Step S105). In this case, the informative sound is not outputted.

When the fact that the elapsed time Ts reaches the output set time T1 from the timer unit 104 to the control unit 103 (Yes in Step S103) in a state in which the voice detecting unit 101 does not detect the voice of the user (No in Step S102) is informed, the control unit 103 outputs the informative sound using the output unit 105 (Step S104).

When the voice detecting unit 101 detects the voice from the user subsequently (Yes in Step S102), the voice recognizing unit 102 carries out the voice recognizing process (Step S105).

In this manner, the voice input of the user is not hindered by not outputting the informative sound while the user is inputting the voice by controlling so as not to output the informative sound once the start of the voice input of the user is detected and the voice recognizing process is started in the first embodiment.

(Modifications)

In the first embodiment, by outputting the informative sound after the voice detecting unit 101 has started the voice input waiting state, there is a possibility that the voice detecting unit 101 determines this informative sound as the start of the voice input by mistake. In order to prevent such erroneous operation, the following modification in operation is conceivable.

The voice detecting unit 101 analyzes the frequency of the signal inputted to the voice detecting unit 101 by Fourier transform or the like and, when the input signal is similar to the informative sound, that signal is not determined as the start of the voice input.

At the time of this determination, the voice detecting unit 101 references a parameter of the informative sound outputted from the output unit 105.

Also, by acquiring information on time to output the informative sound from the control unit 103 by the voice detecting unit 101, the fact that the inputted signal is the informative sound is recognized further precisely.

When the output of the informative sound continues for a long period, the voice input of the user might be detected during the output of the informative sound. In such a case, the output of the informative sound may be discontinued.

In this embodiment, only the informative sound is employed as a method of urging the user to input the voice. However, other informative signal may be used in addition to the informative sound.

For example, a method of urging the user visually by light or display or urging the user tactually to input the voice by vibration of the apparatus or the like may be used as the informative signal.

In the case of using these informative signals, the voice input of the user is not hindered by discontinuing the output of the informative signal upon detection of the voice input before the output set time T1.

Second Embodiment

Figure 3:
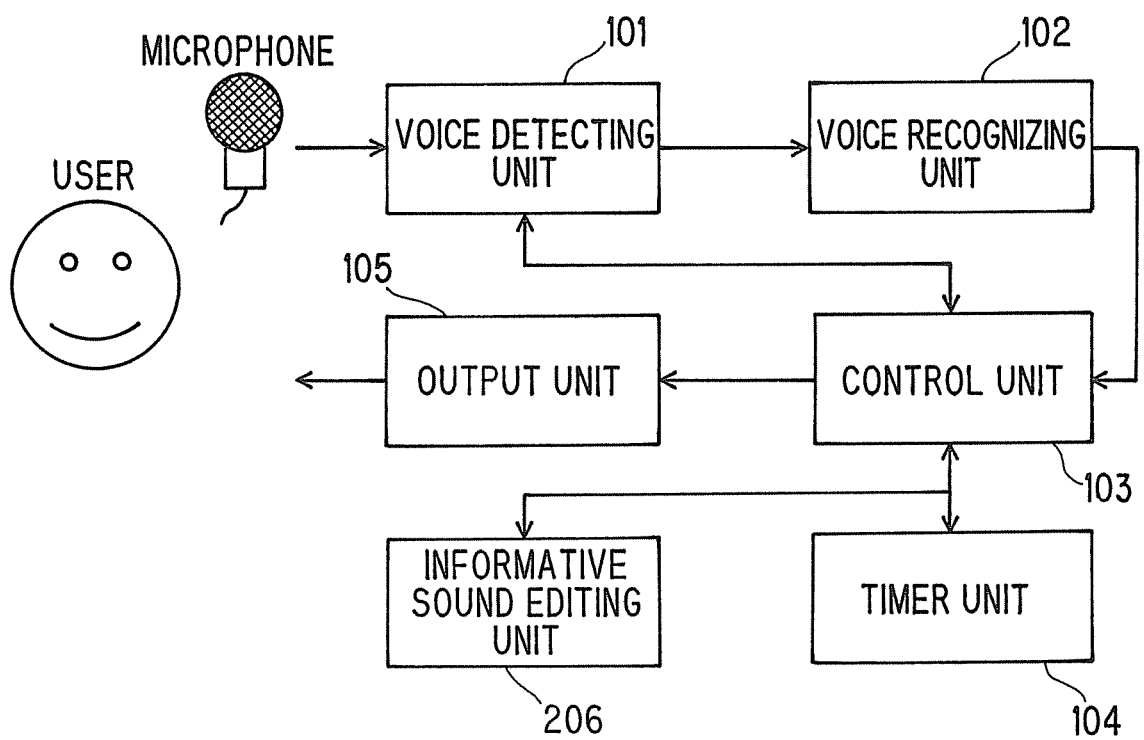
FIG. 3 is a block diagram showing a configuration of the voice recognition apparatus according to a second embodiment.
Figure 4:
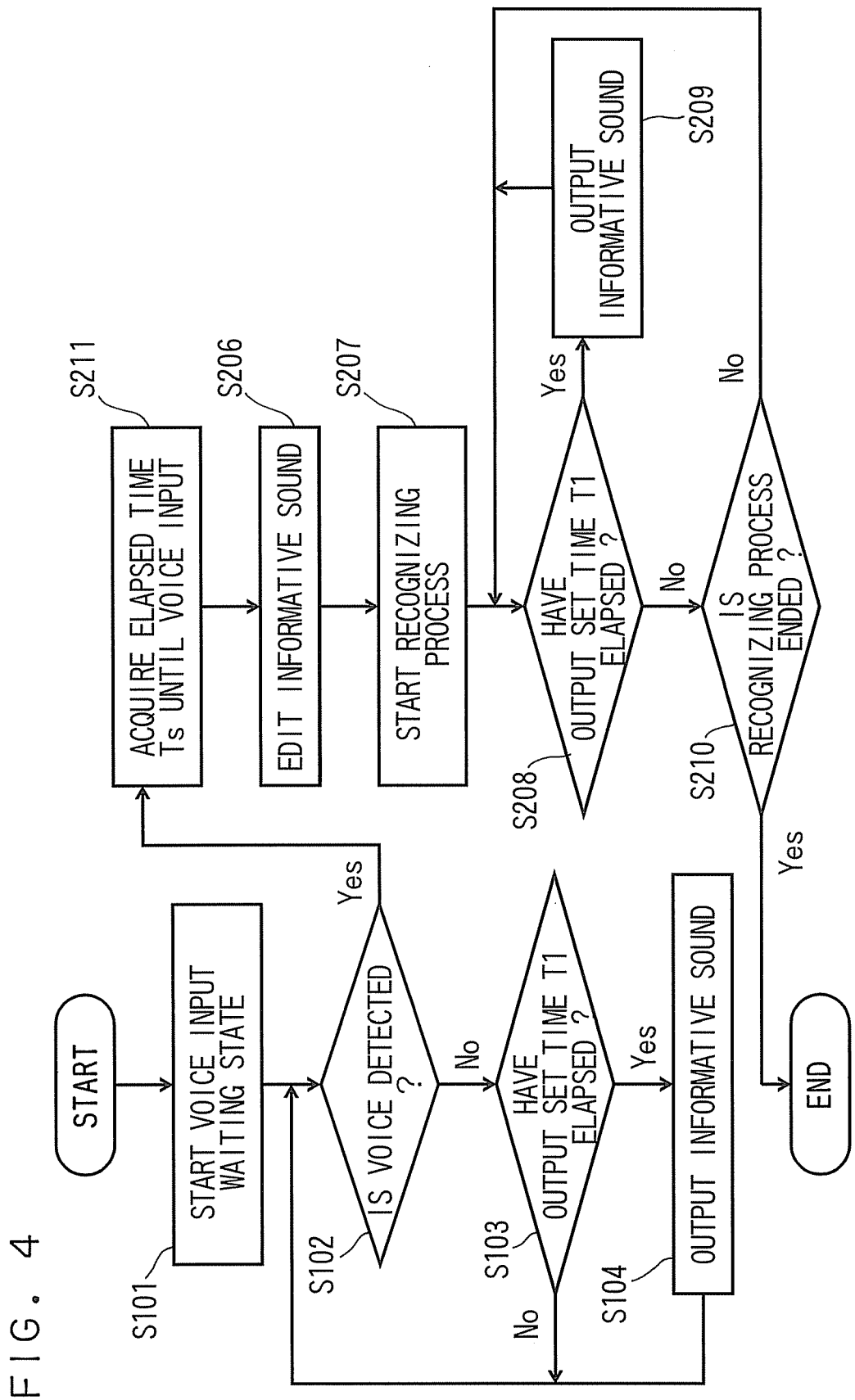
FIG. 4 is a flowchart of the same voice recognition apparatus.

Referring now to FIG. 3 and FIG. 4, the voice recognition apparatus according to a second embodiment of the invention will be described. In the second embodiment, the informative sound is edited on the basis of the timing of voice inputted by the user.

A configuration drawing of the voice recognition apparatus according to the second embodiment is shown in FIG. 3. Components common to those in the first embodiment in FIG. 3 are represented by the same reference numerals as FIG. 1. The second embodiment is different from the first embodiment in that an informative sound editing unit 206 is added and the operations of the control unit 103 and the timer unit 104 are different correspondingly. The voice recognition apparatus will be described below.

When the start of the voice input is informed by the voice detecting unit 101 from the start of the voice input waiting state until the output set time T1 elapses, the control unit 103 acquires the elapsed time Ts from the start of the voice input waiting state until the start of the voice input from the timer unit 104, and requests the edition of the informative sound on the basis of the elapsed time Ts to the informative sound editing unit 206. After having informed the event of the start of the voice input from the voice detecting unit 101, when the fact that the output set time T1 has elapsed from the start of the voice input waiting state is informed from the timer unit 104, the control unit 103 outputs the informative sound edited by the informative sound editing unit 206.

The timer unit 104 counts the elapsed time Ts from the start of the voice input waiting state until the event of the start of the voice input, and outputs the counted result to the control unit 103. Also, the timer unit 104 outputs the fact that elapsed time Ts has reached the output set time T1 from the start of the voice input waiting state to the control unit 103.

The informative sound editing unit 206 edits the informative sound on the basis of the elapsed time Ts from the start of the voice input waiting state until the event of the start of the voice input. The informative sound editing unit 206 edits parameters of the informative sound to increase with shortening of the elapsed time Ts so as not to hinder the vocalization of the user. When the elapsed time Ts is larger than the output set time T1, it means that since the informative sound is already outputted, edition of the parameter is not carried out.

The parameters of the informative sound include the volume, the output duration, and the frequency. The parameter to be edited may be selected from one of these parameters, or a plurality of the parameters may be edited simultaneously.

A method of editing by the informative sound editing unit 206 will be described below.

A first method of edition will be described.

When the user starts the voice input immediately after the start of the voice input waiting state, there is little need of the informative sound which urges the user to input the voice.

Therefore, the informative sound editing unit 206 edits the parameter to lower the volume of the informative sound with shortening of the elapsed time Ts. The volume may be specified by an amplitude value or a logarithmic power and, for example, the volume Volume is controlled by the following expression (1).

$$\text{Volume} = V * Ts/T1 \quad (1)$$

where V is a positive constant which represents a reference volume.

A second method of edition will be described.

When the user starts the voice input immediately after the start of the voice input waiting state, there is little need of the informative sound which urges the user to input the voice.

Therefore, the informative sound editing unit 206 edits the parameter to shorten the output duration of the informative sound with shortening of the elapsed time Ts. For example, the output duration Duration is controlled by the following expression (2)

$$\text{Duration} = D * Ts/T1 \quad (2)$$

where D is a positive constant which represents a reference output duration.

A third method of edition will be described.

When the user starts the voice input immediately after the start of the voice input waiting state, there is little need of the informative sound which urges the user to input the voice.

Therefore, the informative sound editing unit 206 edits the parameter to make the frequency of the informative sound get close to a non-audible area with shortening of the elapsed time Ts. The amount of shift Shift to make the informative sound get close to the non-audible area is controlled, for example, by the following expression (3).

$$\text{Shift} = S * c * (T1 - Ts) \text{ (where } T1 > Ts\text{)} \quad (3)$$
$$= 0 \text{ (where } T1 <= Ts\text{)}$$

where S represents a positive constant which represents the amount of movement from the reference frequency, and c is a positive constant which represents the degree of edition.

The parameters in the expressions (1) to (3) shown above may simply be those which monotonously change with respect to the magnitude of the elapsed time Ts and, for example, a step function which changes significantly when the elapsed time Ts becomes smaller than a certain threshold value may be employed.

Referring now to FIG. 3 and FIG. 4, an operation of the voice recognition apparatus according to the second embodiment will be described. FIG. 4 is a flowchart showing the operation of the voice recognition apparatus. In FIG. 4 as well, steps which can be commonly used with the first embodiment are represented by the same step numbers as in FIG. 2.

The control unit 103 firstly outputs the waiting start signal which indicates the start of the voice input waiting state to the voice detecting unit 101, and requests the timer unit 104 to start the counting of the elapsed time Ts (Step S101).

When the fact that the elapsed time Ts reaches the output set time T1 from the timer unit 104 to the control unit 103 (Yes in Step S103) in the state in which the voice detecting unit 101 does not detect the voice of the user (No in Step S102) is informed, the control unit 103 outputs the informative sound using the output unit 105 (Step S104).

On the other hand, when the voice detecting unit 101 detects the voice of the user (Yes in Step S102), the voice detecting unit 101 informs the event of the start of the voice input to the control unit 103.

Subsequently, the control unit 103 acquires the elapsed time Ts from the timer unit 104 (Step S211), and the informative sound editing unit 206 edits the informative sound on the basis of the elapsed time Ts obtained from the control unit 103 (Step S206). The method of editing is as described above.

Subsequently, the voice recognizing unit 102 starts the voice recognizing process for the voice signal inputted from the voice detecting unit 101 (Step S207).

When the output set time T1 has elapsed from the start of the voice detection after the voice recognizing unit 102 has started the voice recognizing process (Yes in Step S208), the control unit 103 outputs the informative sound to the user via the output unit 105 (Step S209). Since the informative sound outputted here is the informative sound edited by the informative sound editing unit 206, the entry of the user is hardly hindered.

Finally, when the voice recognizing process by the voice recognizing unit 102 is ended (Yes in Step S210), the control unit 103 acquires the result of voice recognition (END).

According to the second embodiment in this manner, when the start of the voice input by the user is detected, the informative sound is edited on the basis of the timing of the start of the voice input. The informative sound is edited so as not to hinder the voice input by the user if the detection of the start of the voice input is achieved in an early stage.

(Modifications)

As an example of the informative sound, there is a mode of outputting a sentence such as "nyuu-ryoku-shiekudasai (Input your voice now)" after having pushed a vocalization button. In such a mode, the sentence may be replaced by a short phrase such as "do-zo (Say now)" or "hai (Here you go)" for the purpose of shortening the output duration of the informative sound.

In the second embodiment, the informative sound is employed as a method of urging the user to input the voice. However, other informative signal may be used in addition to the informative sound.

For example, a method of urging the user visually by light or display or urging the user tactually to input the voice by vibration of the apparatus is also conceivable. In this method as well, the parameter of the informative signal may be edited as follows.

As regards the visual feedback, the informative signal may be restrained so as not to hinder the vocalization of the user by weakening the output strength according to the shortness of the elapsed time Ts, by shortening the display length, or by editing toward the frequency in an invisible area.

In particular, as a method of weakening the output strength, an output of the informative signal which does not hinder the voice input by the user is enabled by weakening the strength of light to be outputted, by changing the direction of light to a direction different from the direction of the user and when using the display, by reducing a display area, or by selecting a color which is similar to the background color.

As regards the tactual feedback, the informative signal may be restrained so as not to hinder the vocalization of the user by weakening the vibration strength according to the shortness of the elapsed time Ts, by shortening the vibration time, or by reducing the frequency of the vibration.

Third Embodiment

Figure 5:
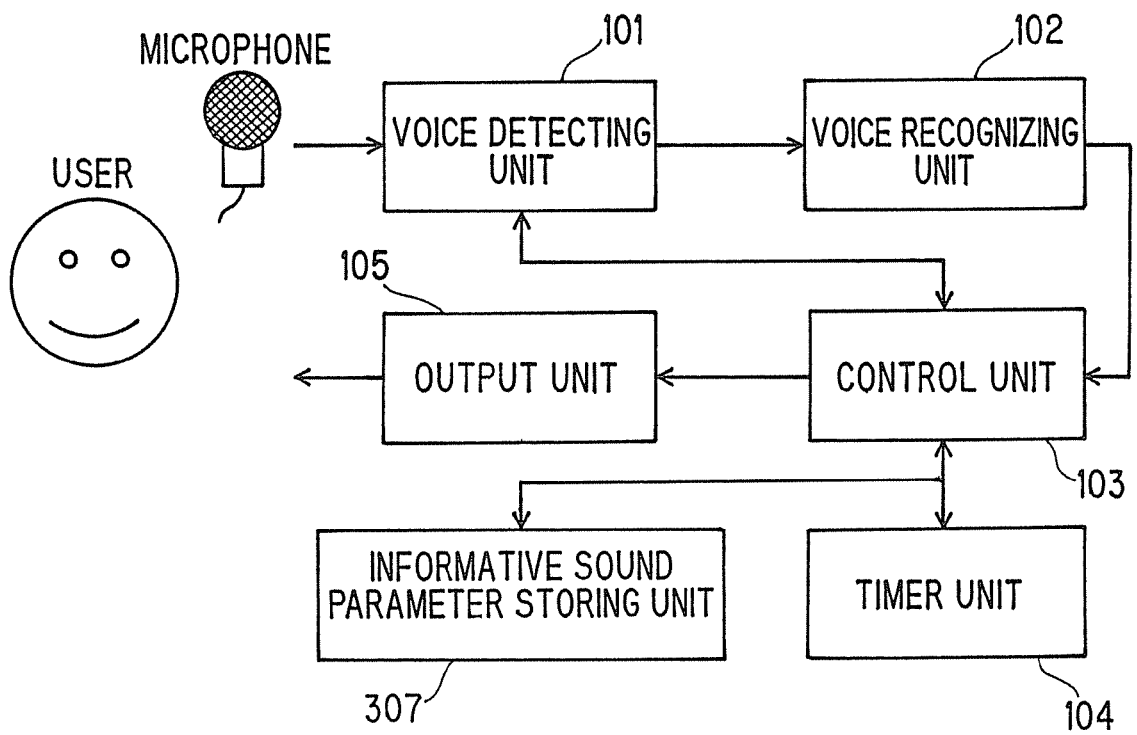
FIG. 5 is a block diagram showing a configuration of the voice recognition apparatus according to a third embodiment.
Figure 6:
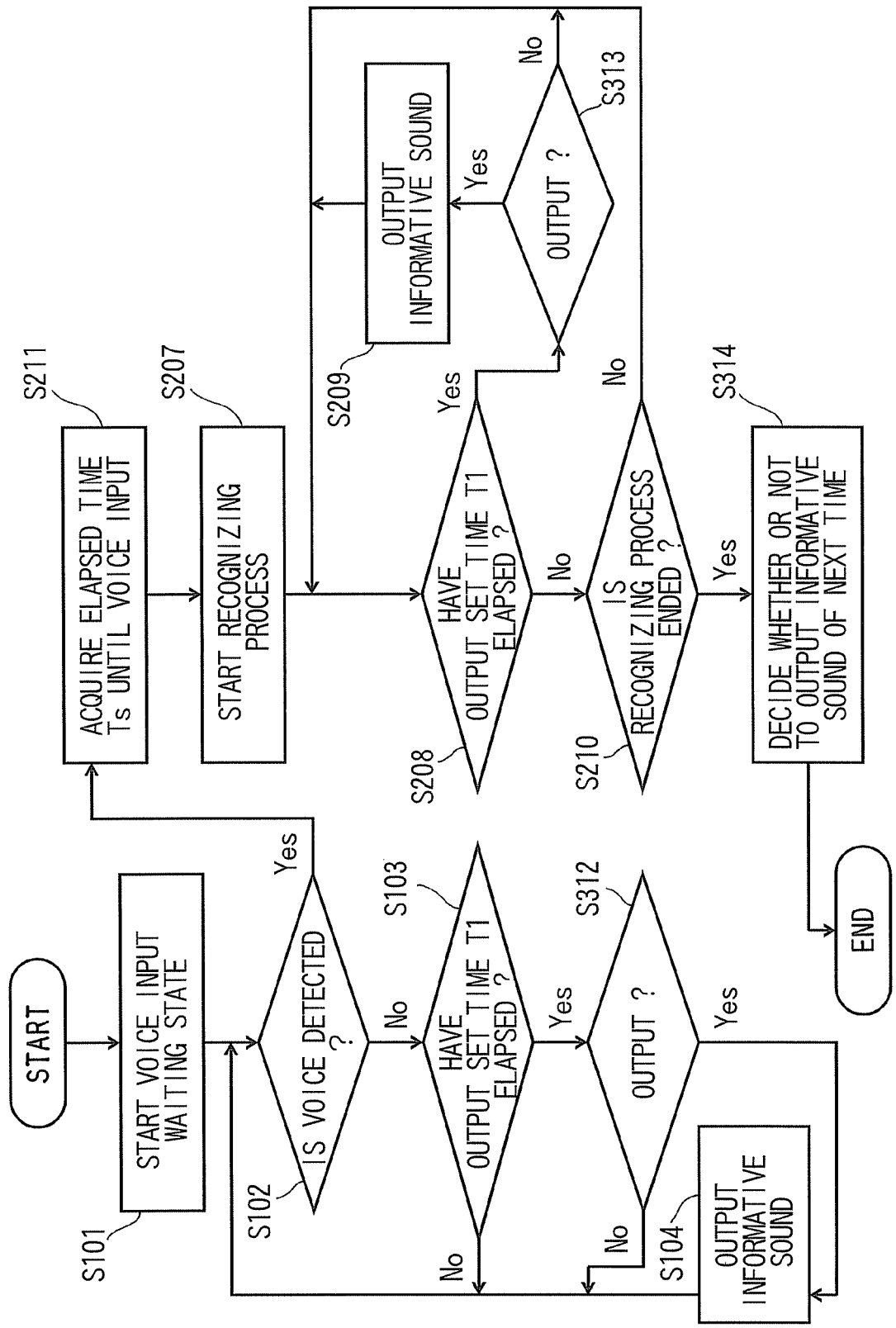
FIG. 6 is a flowchart of the same voice recognition apparatus.

Referring now to FIG. 5 and FIG. 6, the voice recognition apparatus according to a third embodiment of the invention will be described. In the third embodiment, whether or not the informative sound is to be outputted at the time of the next entry is determined on the basis of the timing of voice input by the user.

A configuration drawing of the voice recognition apparatus according to the third embodiment is shown in FIG. 5. Components common to those in the first embodiment in FIG. 5 are represented by the same reference numerals as FIG. 1. The third embodiment is different from the first embodiment in that an informative sound parameter storing unit 307 is added and the operation of the control unit 103 is edited correspondingly.

The voice recognition apparatus will be described in detail below.

When the event of the start of the voice input is informed from the voice detecting unit 101 from the start of the voice input waiting state until the output set time T1 of this time, the control unit 103 decides not to output the informative sound for the next time and if not, the control unit 103 decides to output the informative sound for the next time. Flag information whether or not to output the informative sound for the next time is stored in the informative sound parameter storing unit 307. The control unit 103 decides whether or not to output the informative sound by referring the flag information stored in the informative sound parameter storing unit 307 when the elapsed time Ts reaches the output set time T1.

The informative sound parameter storing unit 307 stores the flag information which indicates whether or not to output the informative sound.

The control unit 103 may also decide the output of the informative sound on the basis of the elapsed time Ts from the start of the voice input waiting state until the voice input is detected. In this case, the control unit 103 decides not to output the informative sound for the next time when the elapsed time Ts is smaller than the predetermined time.

The control unit 103 may also decide the output of the informative sound on the basis of the history of the elapsed time Ts from the start of the voice detection until the voice input is detected.

There are methods of deciding the parameter of the informative sound as follows.

A first method of deciding the parameter of the informative sound will be described.

In the first method, the decision is made by referring to the elapsed time Ts in the entire entry of the voice recognition from the beginning to the present. For example, the control unit 103 decides not to output the informative sound for the next time when the number of times of the case where the elapsed time Ts is smaller than the output set time T1 is larger than the number of times of the case where the elapsed time Ts is larger than the output set time T1 in the entire entry until the present.

The control unit 103 decides not to output the informative sound for the next time when an average value of the elapsed time Ts in the entire entry from the beginning to the present is smaller than a predetermined time.

In the first method of deciding the parameter of the informative sound, the decision of the output of the informative sound while putting the stress on the tendency of the timing to start the voice input in the past is enabled.

It is also applicable to store the history for each user, so that the decision of output according to the tendencies of the users is enabled.

A second method of deciding the parameter of the informative sound will be described.

In the second method, the decision is made by referring to the elapsed time Ts at the time of the entry harked back from the voice recognition of this time by a predetermined number of times n. For example, when the number of times a of the case where the elapsed time Ts is smaller than the output set time T1 is larger than the number of times b of the case where the elapsed time Ts is larger than the output set time T1 at the time of the entry harked back from the voice recognition of this time by the predetermined number of times n, the control unit 103 decides not to output the informative sound for the next time.

Also, the control unit 103 decides not to output the informative sound for the next time when the average value of the elapsed time Ts at the time of the entry harked back from the voice recognition of this time by the predetermined number of times n is smaller than the predetermined time.

In the second method of deciding the parameter of the informative sound, the decision of the output of the informative sound while considering the variation in timing to start the voice input by the user is enabled.

It is applicable to store the history for each user, so that the decision of output according to the tendencies of the users is enabled.

Referring now to FIG. 5 and FIG. 6, an operation of the voice recognition apparatus according to the third embodiment will be described. FIG. 6 is a flowchart showing the operation of the voice recognition apparatus. In FIG. 6 as well, steps which can be commonly used with the first and second embodiments are represented by the same step numbers as in FIG. 2 and FIG. 4.

The control unit 103 firstly outputs the waiting start signal which indicates the start of the voice input waiting state in the voice recognition of this time to the voice detecting unit 101, and requests the timer unit 104 to start the counting of the elapsed time Ts (Step S101).

When the fact that the elapsed time Ts reaches the output set time T1 from the timer unit 104 to the control unit 103 (Yes in Step S103) in the state in which the voice detecting unit 101 does not detect the voice of the user (No in Step S102) is informed, the control unit 103 decides whether or not to output the informative sound while referring to information in the informative sound parameter storing unit 307 decided on the basis of the information until the last time (Step S312) and, when it is decided to output the informative sound (Yes in Step S312), the control unit 103 outputs the informative sound using the output unit 105 (Step S104).

In contrast, when the voice detecting unit 101 detects the voice of the user (Yes in Step S102), the voice detecting unit 101 informs the event of the start of the voice input to the control unit 103.

Then, the control unit 103 acquires the elapsed time Ts from the timer unit 104 (Step S211).

Subsequently, the voice recognizing unit 102 starts the voice recognizing process to the voice signal inputted from the voice detecting unit 101 (Step S207).

Then, when the elapsed time Ts after having started the voice input waiting state reaches the output set time T1 after the voice recognizing unit 102 has started the voice recognizing process at this time (Yes in Step S208) as well, the control unit 103 decides whether or not to output the informative sound while referring to information in the informative sound parameter storing unit 307 decided on the basis of the information until the last time (Step S313) and, when it is decided to output the informative sound (Yes in Step S313), the control unit 103 outputs the informative sound to the user via the output unit 105 (Step S209).

Finally, when the voice recognizing process by the voice recognizing unit 102 is ended (Yes in Step S210), the control unit 103 determines whether or not to output the informative sound for the next time on the basis of the elapsed time Ts acquired in Step S211 by the above-described method, and stores the result of determination in the informative sound parameter storing unit 307 (Step S314). The result of determination is used in Steps S312 and S313 in the voice recognition of the next time.

According to the third embodiment in this manner, when the start of the voice input by the user is detected, whether or not to output the informative sound for the next time is decided on the basis of the timing to start the voice input according to the method described above. Accordingly, control of the informative sound which does not hinder the voice input for users who have a tendency to start the voice input at an early timing or users who have a tendency to start the voice input at the same time as the output of the informative sound is enabled.

(Modifications)

The control unit 103 may decide to output the informative sound of the next time before the start of the voice recognizing process or after the voice recognizing process is ended. When deciding to output the informative sound after the voice recognizing process is ended, it is also possible to decide to output the informative sound of the next time only when an effective result of voice recognition (a result in which the score of the voice recognition is higher than a certain value) is obtained.

When the voice detecting unit 101 detects the voice input erroneously, the probability that the result of voice recognition is not an effective result is increased. The influence of the erroneous operation of the voice detecting unit 101 is alleviated by restraining the informative sound only when the effective result of voice recognition is obtained.

The control unit 103 may decide to output the informative sound for urging the user to input the voice when a predetermined time T2 (T2>T1) has elapsed from the start of the voice input waiting state in a state in which the informative sound is not outputted.

Also, the operation to allow the user to restore the output of the informative sound to an initial state is also applicable.

In the third embodiment, the informative sound is employed as a method of urging the user to input the voice. However, other informative signal may be used in addition to the informative sound.

Fourth Embodiment

Figure 7:
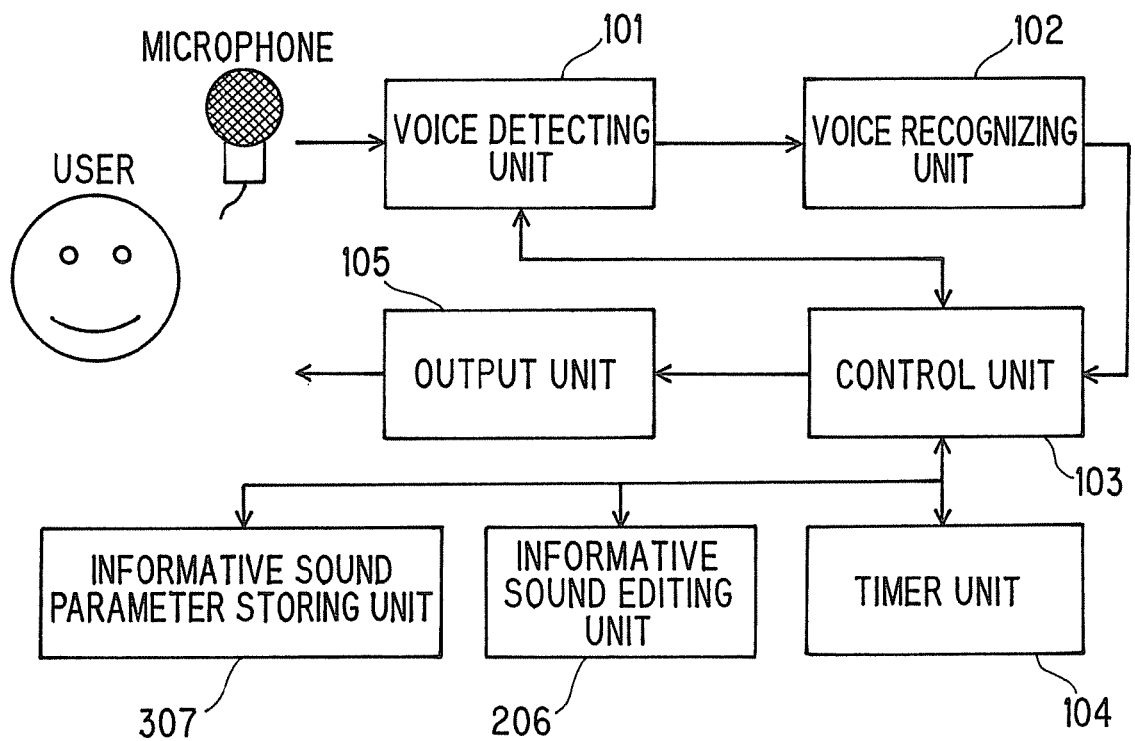
FIG. 7 is a block diagram showing a configuration of the voice recognition apparatus according to a fourth embodiment.
Figure 8:
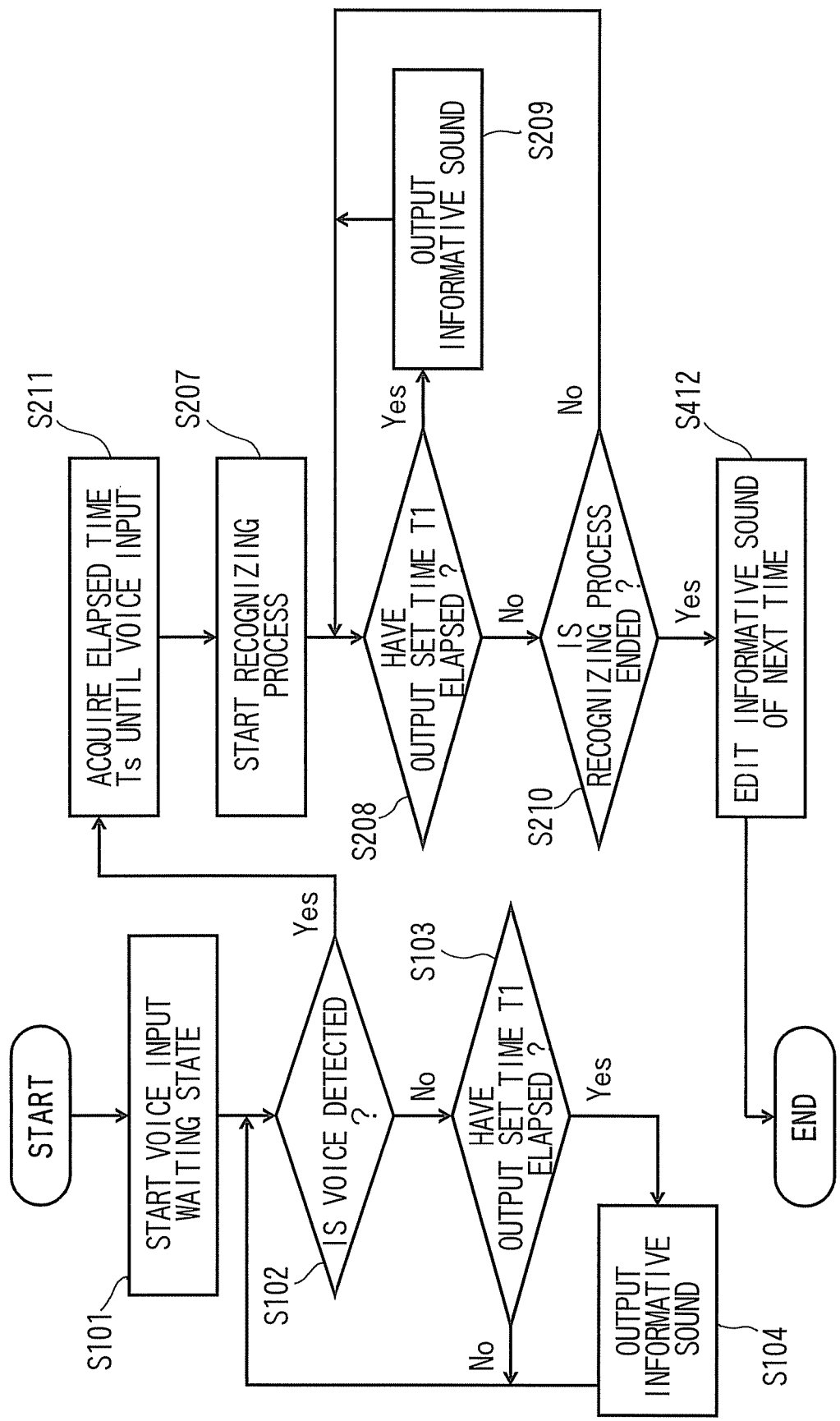
FIG. 8 is a flowchart of the same voice recognition apparatus.

Referring now to FIG. 7 and FIG. 8, the voice recognition apparatus according to a fourth embodiment of the invention will be described. In the fourth embodiment, the informative sound to be outputted at the time of the next entry is edited on the basis of the timing of voice input by the user.

A configuration drawing of the voice recognition apparatus according to the fourth embodiment is shown in FIG. 7. Components common to those in the second and third embodiments in FIG. 7 are represented by the same reference numerals as FIG. 3 and FIG. 5.

The fourth embodiment is different from the third embodiment in that the informative sound editing unit 206 is added and the operations of the control unit 103 and the timer unit 104 are edited correspondingly.

The voice recognition apparatus will be described in detail below.

When the start of the voice input is informed by the voice detecting unit 101, the control unit 103 acquires the elapsed time Ts from the start of the voice input waiting state until the start of the voice input from the timer unit 104, and requests the edition of the informative sound on the basis of the elapsed time Ts to the informative sound editing unit 206. The parameter of the informative sound edited by the informative sound editing unit 206 is stored in the informative sound parameter storing unit 307. The edited informative sound is outputted at the time of the entry from the next time onward. When the fact that the output set time T1 has elapsed from the start of the voice input waiting state is informed from the timer unit 104, the control unit 103 outputs the informative sound of the parameter stored in the informative sound parameter storing unit 307.

The timer unit 104 counts the elapsed time Ts from the start of the voice input waiting state until the event of the start of the voice input, and outputs the counted result to the control unit 103. Also, the timer unit 104 outputs the fact that the elapsed time Ts has reached the output set time T1 from the start of the voice input waiting state to the control unit 103.

The informative sound parameter storing unit 307 stores the parameter of the informative sound that the control unit 103 has decided to output.

The informative sound editing unit 206 edits the informative sound on the basis of the elapsed time Ts from the start of the voice input waiting state until the event of the start of the voice input. The informative sound editing unit 206 edits the parameter of the informative sound to increase with shortening of the elapsed time Ts so as not to hinder the vocalization of the user. The parameters of the informative sound include the output set time T1 until the informative sound is outputted, the volume, the output duration, and the frequency. The parameter to be edited may be selected from one of these parameters, or a plurality of the parameters may be edited simultaneously. A method of editing the parameter of the informative sound will be described later.

The output set time T1 until the informative sound is outputted may possibly be edited in the fourth embodiment. Therefore, the informative sound parameter storing unit 307 also stores the edited output set time T1. The control unit 103 references the output set time T1 stored in the informative sound parameter storing unit 307 and requests the timer unit 104 to count the time. The timer unit 104 informs the fact that the edited output set time T1 has elapsed to the control unit 103.

A method of editing the parameter by the informative sound editing unit 206 will be described.

A first method of edition will be described.

When the user starts the voice input before the informative sound is outputted, the informative sound can be outputted before the vocalization of the user by making the timing to output the informative sound which urges the voice input earlier from the next time onward, so that the vocalization of the user is not hindered.

Therefore, the informative sound editing unit 206 set the output set time T1 to a smaller value so as to shift the timing to output the informative sound forward with shortening of the elapsed time Ts. For example, the output set time T1 is controlled by the following expression (4).

$$T1 = Ts - t \quad (4)$$

where t is a positive constant.

A second method of edition will be described.

When the user starts the voice input immediately after the start of the voice input waiting state, there is little need of the informative sound which urges the user to input the voice. Therefore, the informative sound editing unit 206 edits the parameter to lower the volume of the informative sound with shortening of the elapsed time Ts. The volume may be specified by an amplitude value or a logarithmic power and, for example, the volume Volume is controlled by the following expression (5).

$$\text{Volume} = V * Ts/T1 \quad (5)$$

where V is a positive constant which represents the reference volume.

A third method of edition will be described.

When the user starts the voice input immediately after the start of the voice input waiting state, there is little need of the informative sound which urges the user to input the voice. Therefore, the informative sound editing unit 206 edits the parameter to shorten the output duration of the informative sound with shortening of the elapsed time Ts. For example, the output duration Duration is controlled by the following expression (6).

$$\text{Duration} = D * Ts/T1 \quad (6)$$

where D is a positive constant which represents the reference output duration.

A fourth method of edition will be described.

When the user starts the voice input immediately after the start of the voice input waiting state, there is little need of the informative sound which urges the user to input the voice. Therefore, the informative sound editing unit 206 edits the parameter to make the frequency of the informative sound get close to the non-audible area with shortening of the elapsed time Ts. The amount of shift Shift to make the informative sound get close to the non-audible area is controlled, for example, by the following expression (7).

$$\text{Shift} = S * c * (T1 - Ts) \text{ (where } T1 > Ts\text{)} \quad (7)$$
$$= 0 \text{ (where } T1 <= Ts\text{)}$$

where S represents a positive constant which represents the amount of movement from the reference frequency, c is a positive constant which represents the degree of edition.

The parameters in the expressions (4) to (7) shown above must simply be those which monotonously change with respect to the magnitude of the elapsed time Ts and, for example, a step function which changes significantly when the elapsed time Ts becomes smaller than a certain threshold value may be employed.

The informative sound editing unit 206 may also decide the edition content of the informative sound on the basis of the history of the elapsed time Ts from the start of the voice detection until the voice input is detected. The following method of deciding is conceivable.

The parameter of the informative sound is decided by referring to the elapsed time Ts in the entire entry until the present.

For example, the average value of the elapsed time Ts in the entire entry is employed as the elapsed time Ts at the time of editing the parameter of the informative sound. In this method of deciding the parameter of the informative sound, the decision of the output of the informative sound while putting the stress on the tendency of the timing to start the voice input in the past is enabled. It is applicable to store the history for each user, so that the decision of output according to the tendencies of the users is enabled.

As the method of editing on the basis of the history, the parameter of the informative sound is decided by referring to the elapsed time Ts in the entry harked back from the present by the predetermined number of times.

For example, the average value of the elapsed time Ts in the entry harked back from the present by the predetermined number of times is employed as the elapsed time Ts at the time of editing the parameter of the informative sound. In this method of deciding the parameter of the informative sound, the decision of the output of the informative sound while considering the variation in timing to start the voice input by the user is enabled. It is applicable to store the history for each user, so that the decision of output according to the tendencies of the users is enabled.

Referring now to FIG. 7 and FIG. 8, an operation of the voice recognition apparatus according to the fourth embodiment will be described. FIG. 8 is a flowchart showing the operation of the voice recognition apparatus. In FIG. 8 as well, steps which can be commonly used with the third embodiment are represented by the same step number as in FIG. 6.

The control unit 103 firstly outputs the start of the voice input waiting state of this time to the voice detecting unit 101 and requests the timer unit 104 to start the counting of the elapsed time Ts (Step S101).

Subsequently, when the fact that the elapsed time Ts reaches the output set period T1 from the timer unit 104 to the control unit 103 (Yes in Step S103) in the state in which the voice detecting unit 101 does not detect the voice of the user (No in Step S102) is informed, the control unit 103 acquires the parameter of the informative sound from the information in the informative sound parameter storing unit 307 decided by the information until the previous time, and outputs the informative sound of the parameter acquired by using the output unit 105 (Step S104).

In contrast, when the voice detecting unit 101 detects the voice of the user (Yes in Step S102), the voice detecting unit 101 informs the event of the start of the voice input to the control unit 103.

Subsequently, the voice recognizing unit 102 starts the voice recognizing process of this time for the voice signal inputted from the voice detecting unit 101 (Step S207).

When the elapsed time Ts from the start of the voice input waiting state reaches the output set time T1 after the voice recognizing unit 102 has started the voice recognizing process of this time (Yes in Step S208) as well, the control unit 103 outputs the informative sound to the user via the output unit 105 (Step S209). The informative sound outputted here is also the informative sound of the parameter stored in the informative sound parameter storing unit 307 which is decided on the basis of the information until the previous time.

Finally, when the voice recognizing process by the voice recognizing unit 102 is ended (Yes in Step S210), the control unit 103 edits the parameter of the informative sound of the next time by the method described above, and stores a new parameter in the informative sound parameter storing unit 307 (Step S412). This stored parameter is used as the parameters in Steps S104 and S206 in the voice recognition of the next time.

According to the fourth embodiment in this manner, when the start of the voice input by the user is detected, the informative sound from the next time onward is edited on the basis of the timing to start the voice input. The informative sound is edited so as not to hinder the voice input by the user if the detection of the start of the voice input is achieved in an early stage. Accordingly, control of the informative sound which does not hinder the voice input for users who have a tendency to start the voice input at an early timing or users who have a tendency to start the voice input at the same time as the output of the informative sound is enabled.

(Modifications)

The control unit 103 may decide to output the informative sound of the next time before the start of the voice recognizing process or after the voice recognizing process is ended. When deciding to output the informative sound after the voice recognizing process is ended, it is also possible to decide to output the informative sound of the next time only when an effective result of voice recognition (a result in which the score of the voice recognition is higher than a certain value) is obtained.

When the voice detecting unit 101 detects the voice input erroneously, the probability that the result of voice recognition is not an effective result is increased. The influence of the erroneous operation of the voice detecting unit 101 is alleviated by controlling the informative sound only when the effective result of voice recognition is obtained.

The control unit 103 may decide to output the informative sound for urging the user to input the voice when the predetermined time T2 (T2>T1) has elapsed from the start of the voice input waiting state. The parameter of the informative sound in this case employed here is the one in an initial state. Also, the operation to allow the user to restore the parameter of the informative sound to the initial state is also applicable.

As an example of the informative sound, there is a mode of outputting the sentence such as "nyuu-ryoku-shiekudasai (Input your voice)" after having pushed the vocalization button.

In such a mode, the sentence may be replaced by the short phrase such as "do-zo (Say now)" or "hai (Here you go)" for the purpose of shortening the output duration of the informative sound.

In the fourth embodiment, the informative sound is employed as a method of urging the user to input the voice. However, other informative signal relating to light or tactile sense may be used in addition to the informative sound.

Fifth Embodiment

The voice recognition apparatus according to a fifth embodiment of the invention will be described. In the fifth embodiment, a method of using not only the informative sound, but also the informative signal using other means will be described.

A configuration of the fifth embodiment is shown in FIG. 2. In the fifth embodiment, operations of the output unit 105 and the informative sound editing unit 206 are edited in comparison with the second embodiment. Detailed description will be given below.

The output unit 105 in the fifth embodiment includes not only the sound, but also other means as means for urging the user to input the voice. For example, the informative signal such as the visual signal using light or the display, or the informative signal such as the tactile signal using vibrations is provided.

The informative sound editing unit 206 changes the type of the informative signal to be outputted from the second time onward on the basis of the elapsed time Ts from the start of the voice input waiting state of the voice detecting unit 101 until the start of the voice input by the user. For example, in the apparatus for inputting and outputting the voice, the attention of the user is considered to be directed mainly to the sound information. Employing the visual or tactile informative signal rather than outputting the informative sound during the voice input by the user allows the output of the informative signal without hindering the voice input. Therefore, the informative sound editing unit 206 is changed from a configuration to output the informative sound to a configuration to output the visual or tactile informative signal when the elapsed time Ts is shortened.

The control unit 103 sends an instruction to output the informative signal of the selected type to the output unit 105.

The informative sound editing unit 206 may be adapted to sequence the audible, visual, and tactile informative signals of various parameters so as not to hinder the voice input by the user and select the informative signal of the parameter which does not hinder the voice input according to the shortness of the elapsed time Ts.

In the fifth embodiment as well, the operation which does not hinder the vocalization of the user is enabled by changing the informative signal from the second time onward.

Modifications

The invention is not limited to the embodiments shown above as is, and components may be modified and embodied without departing from the scope of the invention in the stage of implementation. Various modes of the invention are achieved by combining the plurality of components disclosed in the embodiments described above as needed. For example, several components may be eliminated from all the components shown in the embodiment. Also, the components disclosed in different embodiments may be combined as needed.

What is claimed is:

1. A voice recognition apparatus comprising:
    an input unit configured to input a voice;
    a voice detecting unit configured to detect the voice after starting a voice input waiting state in which a voice recognition is enabled and the apparatus waits for input of the voice;

a voice recognizing unit configured to recognize the voice;

a timer unit configured to count an elapsed time Ts from a start of the voice input waiting state;

an output unit configured to output an informative sound which prompts for input of the voice in response to the elapsed time Ts reaching a preset output set time; and a control unit configured to control the output unit (1) to output the informative sound according to at least one of a reference volume, a reference frequency, or a reference output duration in response to the elapsed time Ts reaching the output set time if the voice detecting unit does not detect the voice during the voice input waiting state, and (2) to output the informative sound according to at least one of a lower volume than the reference volume, a shifted frequency relative to the reference frequency, or a shorter output duration relative to the reference output duration if the voice detecting unit detects the voice before the elapsed time reaches the output set time, wherein the lower volume, the shifted frequency, and the shorter output duration are continuous functions of a value of Ts at a time that the voice detecting unit detects the voice.

2. The apparatus according to claim 1, wherein, if the elapsed time Ts at the time that the voice detecting unit detects the voice is after the output set time, the control unit controls the output unit to output the volume of the informative sound at the reference volume, to output the informative sound at the reference frequency, or to output the informative sound at the reference output duration.

3. The apparatus according to claim 1, wherein the control unit decides a parameter of whether to output the informative sound in a voice recognition of a next time based on the elapsed time Ts at a time of inputting the voice input in the voice recognition of a current time, stores the parameter in a storing unit, and causes the output unit to output the informative sound based on the parameter stored in the storing unit.

4. The apparatus according to claim 1, wherein the control unit moves the shifted frequency of the informative sound nearer to a non-audible area relative to the reference frequency as a continuous function of Ts, wherein the reference frequency is in an audible area.

5. The apparatus according to claim 1, wherein the control unit is further configured to make the output set time in a voice recognition of a next time shorter as the elapsed time Ts is shortened.

6. The apparatus according to claim 1, wherein the output unit further includes an informing unit configured to visually or tactually prompt for input of the voice, and the control unit is further configured to activate the informing unit in conjunction with output of the informative sound.

7. The apparatus according to claim 1, wherein the output unit further includes an informing unit configured to visually or tactually prompt for input of the voice, and the control unit is further configured to activate the informing unit instead of the informative sound for prompting for input of the voice in a voice recognition of a next time.

8. The apparatus according to claim 1, wherein the control unit is further configured to output, to the voice detecting unit, a waiting start signal for causing the voice detecting unit to start the voice input waiting state.

9. A voice recognition method comprising:

inputting a voice;

detecting the voice after starting a voice input waiting state in which a voice recognition is enabled and the inputting is awaited;

recognizing the voice;

counting an elapsed time Ts from a start of the voice input waiting state;

outputting an informative sound which prompts for input of the voice in response to the elapsed time Ts reaching a present output set time; and controlling the outputting (1) to output the informative sound based on at least one of a reference volume, a reference frequency, or a reference output duration if no inputting of the voice has been made during the voice input waiting state prior to the elapsed time Ts reaching the output set time, and (2) to output the informative sound based on at least one of a lower volume than the reference volume, a shifted frequency relative to the reference frequency, or a shorter output duration relative to the reference output duration if inputting of the voice is made during the voice input waiting state prior to the elapsed time Ts reaching the output set time, wherein the lower volume, the shifted frequency, and the shorter duration are continuous functions of a value of Ts at a time that the voice is inputted.

10. A program stored in a computer readable non-transitory medium, the program realizing the functions of:

inputting a voice;

detecting the voice after starting a voice input waiting state during which a voice recognition is enabled and the inputting of the voice is awaited;

recognizing the voice;

counting an elapsed time Ts from a start of the voice input waiting state;

outputting an informative sound which prompts for input of the voice in response to the elapsed time Ts reaching a preset output set time; and controlling the outputting (1) to output the informative sound according to at least one of a reference volume, a reference frequency, or a reference duration if the voice has not been detected during the voice input waiting state prior to the elapsed time Ts reaching the output set time, and (2) to output the informative sound according to at least one of a lower volume relative to the reference volume, a shifted frequency relative to the reference frequency, or a shorter duration relative to the reference duration if the voice is detected during the voice input waiting state prior to the elapsed time Ts reaching the output set time, wherein the lower volume, the shifted frequency, and the shorter duration are continuous functions of a value of Ts at a time that the voice is detected.

* * * * *